United States Patent
Iwata (10) Patent No.: US 10,597,240 B2
(45) Date of Patent: Mar. 24, 2020

(54) CONVEYANCE FACILITY

(71) Applicant: DAIFUKU CO., LTD., Osaka-shi, Osaka (JP)

(72) Inventor: Masahige Iwata, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 16/267,485

(22) Filed: Feb. 5, 2019

(65) Prior Publication Data
US 2019/0248602 A1    Aug. 15, 2019

(30) Foreign Application Priority Data

Feb. 9, 2018   (JP) .................. 2018-021486

(51) Int. Cl.
| | |
|---|---|
| B65G 17/00 | (2006.01) |
| B65G 51/02 | (2006.01) |
| B65G 19/02 | (2006.01) |
| B65G 21/20 | (2006.01) |

(52) U.S. Cl.
CPC .......... B65G 51/02 (2013.01); B65G 19/025 (2013.01); B65G 21/2072 (2013.01); *B65G 2201/02* (2013.01)

(58) Field of Classification Search
None
See application file for complete search history.

(56) References Cited

U.S. PATENT DOCUMENTS

| | | |
|---|---|---|
| 5,404,992 A | 4/1995 | Robu et al. |
| 5,697,301 A | 12/1997 | Sporer |
| 6,851,543 B2 * | 2/2005 | Nakanishi .............. B65G 23/30 198/459.4 |
| 2004/0045793 A1 | 3/2004 | Schonenberger |
| 2004/0107862 A1 | 6/2004 | Suh |
| 2011/0186405 A1 * | 8/2011 | Blanc ....................... B07C 5/36 198/413 |

FOREIGN PATENT DOCUMENTS

| | | |
|---|---|---|
| DE | 29511555 U1 | 10/1995 |
| DE | 29709547 U1 | 8/1997 |
| DE | 19943141 A1 | 3/2001 |
| DE | 10012524 A1 | 9/2001 |
| EP | 2121489 B1 | 4/2012 |
| WO | WO 03/037760 A1 | 5/2003 |
| WO | WO 2008/098785 A2 | 8/2008 |

OTHER PUBLICATIONS

Extended European Search Report from corresponding EP 19155869.1, dated Jul. 5, 2019.

* cited by examiner

*Primary Examiner* — Kavel Singh
(74) *Attorney, Agent, or Firm* — Kusner & Jaffe (57) ABSTRACT

A conveyance facility for conveying a bag along a conveyance path includes a carrier including a traveling wheel traveling on the conveyance path, and a support supporting the bag being suspended, the carrier conveying the bag along the conveyance path; and a traveling rail provided along the conveyance path, and supporting the traveling wheel so as to be travelable. The traveling rail includes an accumulation belt causing the traveling wheel to travel in frictional contact with the support; and a tracking conveyance belt being meshed with the support to thereby cause the traveling wheel to travel.

6 Claims, 5 Drawing Sheets

CONVEYANCE FACILITY

FIELD OF THE INVENTION

The present invention relates to a conveyance facility for conveying articles along a conveyance path, in particular to a conveyance facility for suspended conveyance of the articles.

BACKGROUND OF THE INVENTION

A conventional conveyance facility for suspended conveyance of articles is shown in European Patent No. 2121489. The conveyance facility shown in European Patent No. 2121489 includes a traveling rail guiding carriers (conveyance unit) for the suspended conveyance of the articles along a conveyance path; a drive belt (friction transmission belt) provided along the traveling rail, and coming into frictional contact with the carriers to thereby move the carriers; and a belt drive unit driving the drive belt.

On the drive belt, multiple pins (section dividers) engaging with the carriers are provided at predetermined intervals on a surface on the side of the frictional contact with the carriers. The drive belt comes into frictional contact with the carriers, and also engages with the pins to thereby cause the carriers to travel. Accordingly, the carriers traveling along the traveling rail travel at intervals depending on a distance between adjacent pins.

In the conveyance facility shown in European Patent No. 2121489, the pins on the drive belt engage with the carriers (conveyance unit) to thereby cause the carriers (conveyance unit) to travel. Such pins, however, simply abut a side surface on a rear side of each of the carriers (conveyance unit) with respect to a traveling direction, and do not sufficiently hold the carrier (conveyance unit) with respect to the drive belt. Accordingly and unfortunately, in acceleration or deceleration of the carriers (conveyance unit), depending on a status of the traveling rail, the carriers (conveyance unit) cannot be caused to travel at the intervals kept between the carriers.

SUMMARY OF THE INVENTION

An object of the present invention is to provide a conveyance facility capable of causing the conveyance units to travel at the intervals kept between the conveyance units, without any effect of a traveling state of the conveyance units or the status of the traveling rail.

Problems to be solved by the present invention have been described. Solutions to the problems will be described next.

In other words, a conveyance facility of the present invention is a conveyance facility for conveying an article along a conveyance path, including: a conveyance unit including a traveling body traveling on the conveyance path, and a support traveling with the traveling body and supporting the article being suspended, the conveyance unit conveying the article along the conveyance path; and a traveling rail provided along the conveyance path and supporting the traveling body so as to be travelable, wherein the traveling rail includes: a friction transmission belt causing the traveling body to travel in frictional contact with the support; and a meshing transmission belt being meshed with the support to thereby cause the traveling body to travel.

In the aforementioned configuration, the travel of the conveyance unit is performed in the frictional contact with the friction transmission belt, or in meshed contact with the meshing transmission belt.

Furthermore, the meshing transmission belt is arranged on a downstream side from a position where the friction transmission belt is arranged.

In the aforementioned configuration, the travel of the conveyance unit is switched from the travel in the frictional contact with the friction transmission belt, to the travel in the meshed contact with the meshing transmission belt.

Furthermore, the conveyance facility includes a sending device provided on the conveyance path, and sending out a plurality of the conveyance units traveling on the conveyance path, at predetermined intervals; the friction transmission belt is arranged on an upstream side from a position where the sending device is arranged; and the meshing transmission belt is arranged on the downstream side from the position where the sending device is arranged.

In the aforementioned configuration, the travel of the conveyance unit is switched at the sending device as a boundary, from the travel in the frictional contact with the friction transmission belt, to the travel in the meshed contact with the meshing transmission belt.

Furthermore, the meshing transmission belt is arranged lower than a position where the friction transmission belt is arranged in the traveling rail arranged horizontally.

In the aforementioned configuration, the meshed contact of the meshing transmission belt with the support is performed lower than the frictional contact of the friction transmission belt with the support.

Furthermore, the support includes a contact portion coming into contact with the friction transmission belt; and a meshing portion being meshed with the meshing transmission belt.

In the aforementioned configuration, the frictional contact with the friction transmission belt and the meshed contact with the meshing transmission belt are performed at the support.

Furthermore, the meshing transmission belt includes multiple concave portions to be meshed with the meshing portion; and the concave portions are formed so that multiple peak portions and multiple valley portions are alternately and continuously formed along a moving direction of the meshing transmission belt.

In the aforementioned configuration, the meshing portion of the support is meshed with the concave portions consisting of the continuously formed peak portions and valley portions on the meshing transmission belt.

Furthermore, the meshing portion is composed of a convex member capable of being meshed with the valley portions of the concave portions; and a tip end portion of the convex member is formed to be narrower than a base end portion of the convex member, and narrower than a width of each of the valley portions of the concave portions.

In the aforementioned configuration, the convex member of the meshing portion is meshed with the valley portions of the concave portions of the meshing transmission belt.

According to the conveyance facility of the present invention, the travel of the conveyance unit is switched from the travel in the frictional contact with the friction transmission belt, to the travel in the meshed contact with the meshing transmission belt. Misalignment of the conveyance unit with respect to the belt can thereby be reliably limited. Accordingly, the multiple conveyance units sent out by the sending device at the predetermined intervals can be caused to travel at the intervals kept between the multiple conveyance units, without any effect of a traveling status of the conveyance units.

DESCRIPTION OF THE INVENTION

A conveyance facility 10 according to the present invention will be described. The present invention is not limited to the conveyance facility 10 to be shown below.

Figure 1:
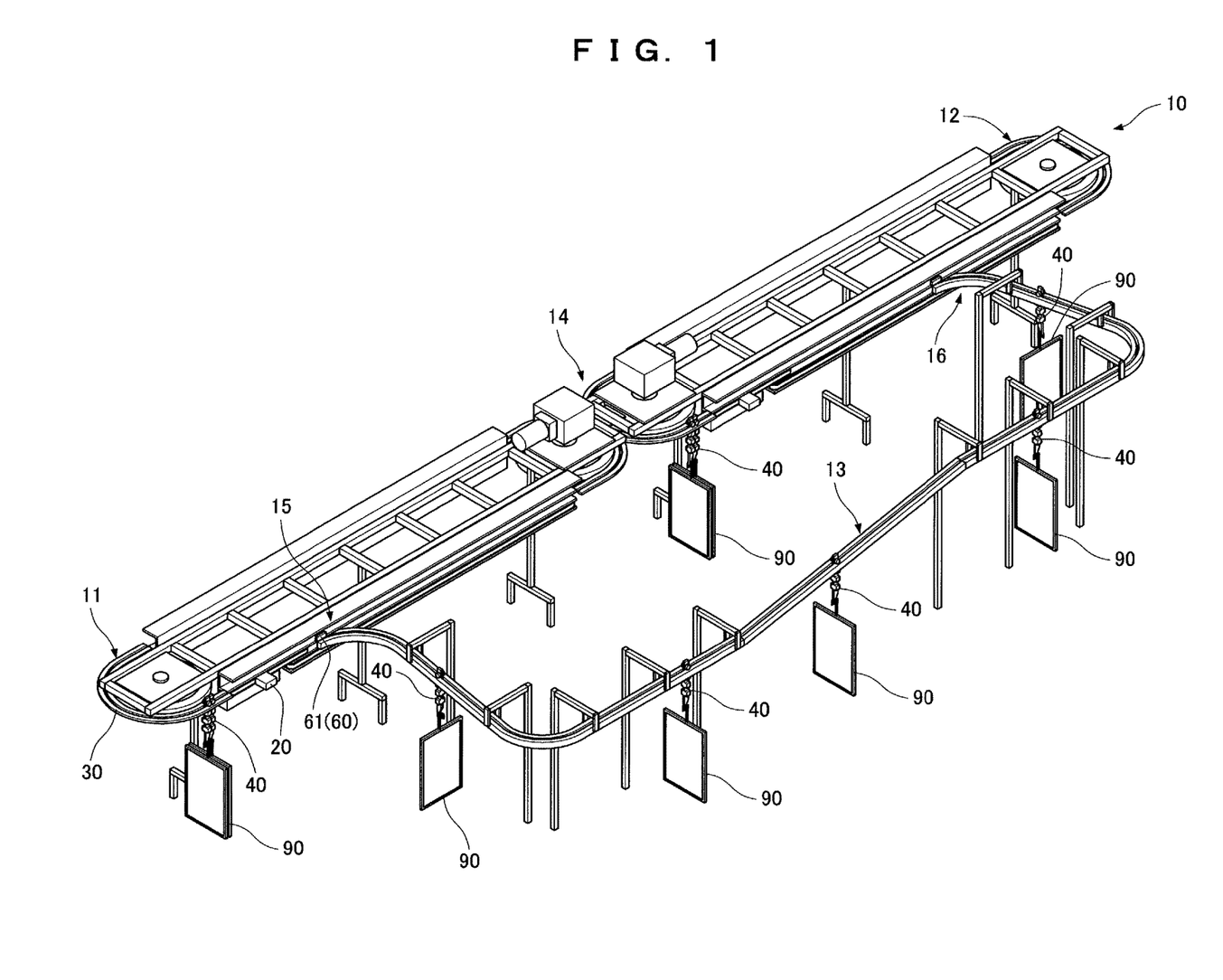
FIG. 1 is a general perspective view of a conveyance facility according to the present invention.

As shown in FIG. 1, the conveyance facility 10 is a suspended conveyance facility for suspended conveyance of bags 90 (an example of "article") containing goods. The conveyance facility 10 includes a first path 11 (an example of "conveyance path") and a second path 12 (an example of "conveyance path") for circularly conveying the bags 90, as well as a detour path 13 (an example of "conveyance path") branching from a location in the middle of the first path 11 and joining the second path 12.

The first path 11 and the second path 12 include loop-like conveyance paths. The first path 11 and the second path 12 have swivel paths on both end portions, respectively. The first path 11 and the second path 12 are serially arranged so that the swivel paths on the respective ones of the end portions face each other. A branch portion 14 is provided at a joint section between the first path 11 and the second path 12 (a portion where the swivel paths face each other).

The branch portion 14 keeps the bags 90 being circularly conveyed on the first path 11 so as to be circularly conveyed on the first path 11. Alternatively, the branch portion 14 causes the bags 90 being circularly conveyed on the first path 11 to be conveyed on the second path 12 through intersection of the branch portion 14. The branch portion 14 keeps the bags 90 being circularly conveyed on the second path 12 so as to be circularly conveyed on the second path 12. Alternatively, the branch portion 14 causes the bags 90 being circularly conveyed on the second path 12 to be conveyed on the first path 11 through the intersection of the branch portion 14.

The detour path 13 is a conveyance path for causing the bags 90 conveyed on the first path 11 to detour without the branch portion 14 so as to join the second path 12. A beginning portion of the detour path 13 branches from the first path 11. An ending portion of the detour path 13 joins the second path 12.

A branch portion 15 is provided at the beginning portion of the detour path 13 (a connecting portion between the detour path 13 and the first path 11). The branch portion 15 is a portion where the detour path 13 branches from a location in the middle of the first path 11. The branch portion 15 keeps the bags 90 conveyed on the first path 11 so as to be conveyed on the first path 11. Alternatively, the branch portion 15 causes some of the bags 90 conveyed on the first path 11 to branch from the first path 11 to the detour path 13 for conveyance.

A joint portion 16 is provided at the ending portion of the detour path 13 (a connecting portion between the detour path 13 and the second path 12). The joint portion 16 is a portion where the detour path 13 joins the second path 12. The joint portion 16 keeps the bags 90 conveyed on the second path 12 so as to be conveyed on the second path 12. Alternatively, the joint portion 16 causes the bags 90 conveyed on the detour path 13 to join the second path 12.

Figure 2A:
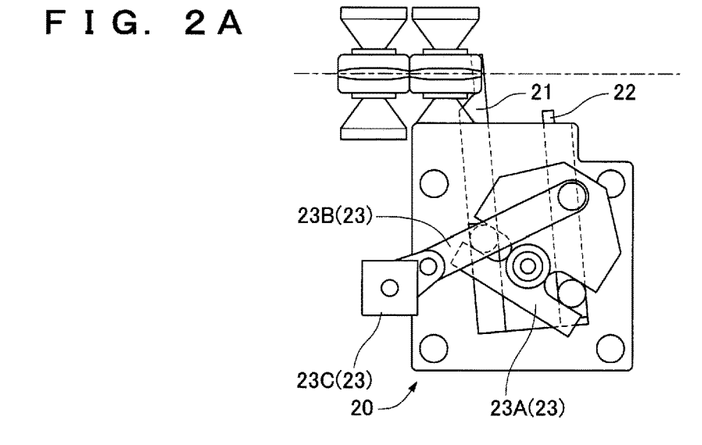
FIG. 2A is a plan view showing an outline of operations of a sending device of the same conveyance facility in a case where a first stopper is moved forward.
Figure 2B:
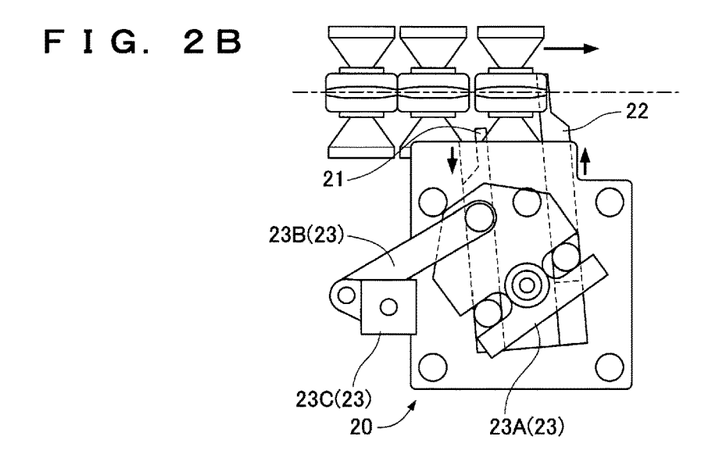
FIG. 2B is a plan view showing the outline of the operations of the sending device of the same conveyance facility in a case where the first stopper is moved backward and a second stopper is moved forward.
Figure 2C:
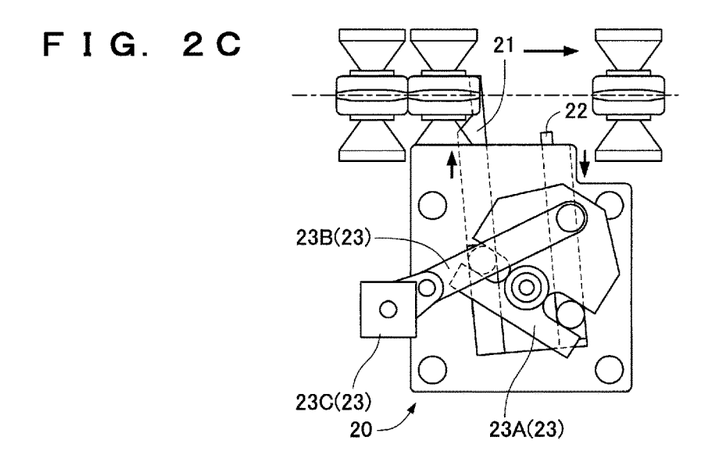
FIG. 2C is a plan view showing the outline of the operations of the sending device of the same conveyance facility in a case where the second stopper is moved backward and the first stopper is moved forward.

On the first path 11, a sending device 20 is provided on an upstream side of the branch portion 15. The sending device 20 is a device for sending out multiple carriers 40 (an example of "conveyance unit") traveling with the bags 90 being suspended, at predetermined intervals. The sending device 20 causes the multiple carriers 40 continuously traveling toward the branch portion 15 to stop once, and causes the adjacent carriers 40 to sequentially travel at the predetermined intervals. As shown in FIGS. 2A to 2C, the sending device 20 includes a first stopper 21 and a second stopper 22 for stopping the carriers 40, and a cam mechanism 23 for moving the first stopper 21 and the second stopper 22.

The first stopper 21 and the second stopper 22 are lengthy members extended orthogonally to a horizontal direction, with respect to a traveling direction of the carriers 40 traveling in the horizontal direction. The first stopper 21 and the second stopper 22 are driven by the cam mechanism 23 so as to move outward and backward with respect to the horizontal direction. Tip end portions of the first stopper 21 and the second stopper 22 move forward with respect to the horizontal direction so as to abut a front surface of each of the carriers 40 in the traveling direction to stop the carrier 40. The tip end portions of the first stopper 21 and the second stopper 22 move backward with respect to the horizontal direction so as to cancel the stop of the carrier 40 caused by the tip end portions. The first stopper 21 is arranged closer to an upstream side of the sending device 20 than the second stopper 22.

The cam mechanism 23 includes a cam body 23A causing the first stopper 21 and the second stopper 22 to alternately move outward and backward, an arm 23B swinging the cam body 23A, and a drive motor 23C driving the arm 23B. The cam mechanism 23 drives the drive motor 23C to operate the arm 23B so as to swing the cam body 23A. The first stopper 21 and the second stopper 22 thereby alternately move outward and backward with respect to the horizontal direction.

The sending device 20 causes the first stopper 21 and the second stopper 22 to alternately move outward and backward, and shifts timings of the carriers 40 passing through the sending device 20, so as to have the predetermined intervals between the adjacent carriers 40. Specifically, as shown in FIG. 2A, the tip end portion of the first stopper 21 abuts the front surface of the carrier 40 traveling from the upstream side of the sending device 20, in the traveling direction. The carrier 40 traveling from the upstream side of the sending device 20 is thereby stopped by the first stopper 21. As shown in FIG. 2B, the cam mechanism 23 is driven to cause the first stopper 21 to move backward and also cause the second stopper 22 to move forward. The carrier 40 stopped by the first stopper 21 thereby travels to a downstream side, and is stopped again by the second stopper 22. As shown in FIG. 2C, at a timing of a subsequent carrier 40 arriving at the first stopper 21, the cam mechanism 23 is driven to cause the first stopper 21 to move forward and also cause the second stopper 22 to move backward. The carrier 40 stopped by the second stopper 22 thereby travels to the downstream side, and the subsequent carrier 40 is stopped by the first stopper 21. In this way, the alternate movement of the first stopper 21 and the second stopper 22 causes only one carrier 40 to pass between the first stopper 21 and the second stopper 22. The adjacent carriers 40 (bags 90) thereby travel at the predetermined intervals.

As shown in FIG. 1, a branch unit 60 is provided at the branch portion 15 of the first path 11. The branch unit 60 is a device for switching the conveyance path of the bags 90 conveyed on the first path 11, to the detour path 13. The branch unit 60 includes a branch device 61 for changing the traveling path of the carriers 40. The branch unit 60 actuates the branch device 61 to direct the carriers 40 traveling on the first path 11, to the detour path 13. The conveyance path of the bags 90 conveyed from the first path 11 is thereby switched to the detour path 13.

Figure 3:
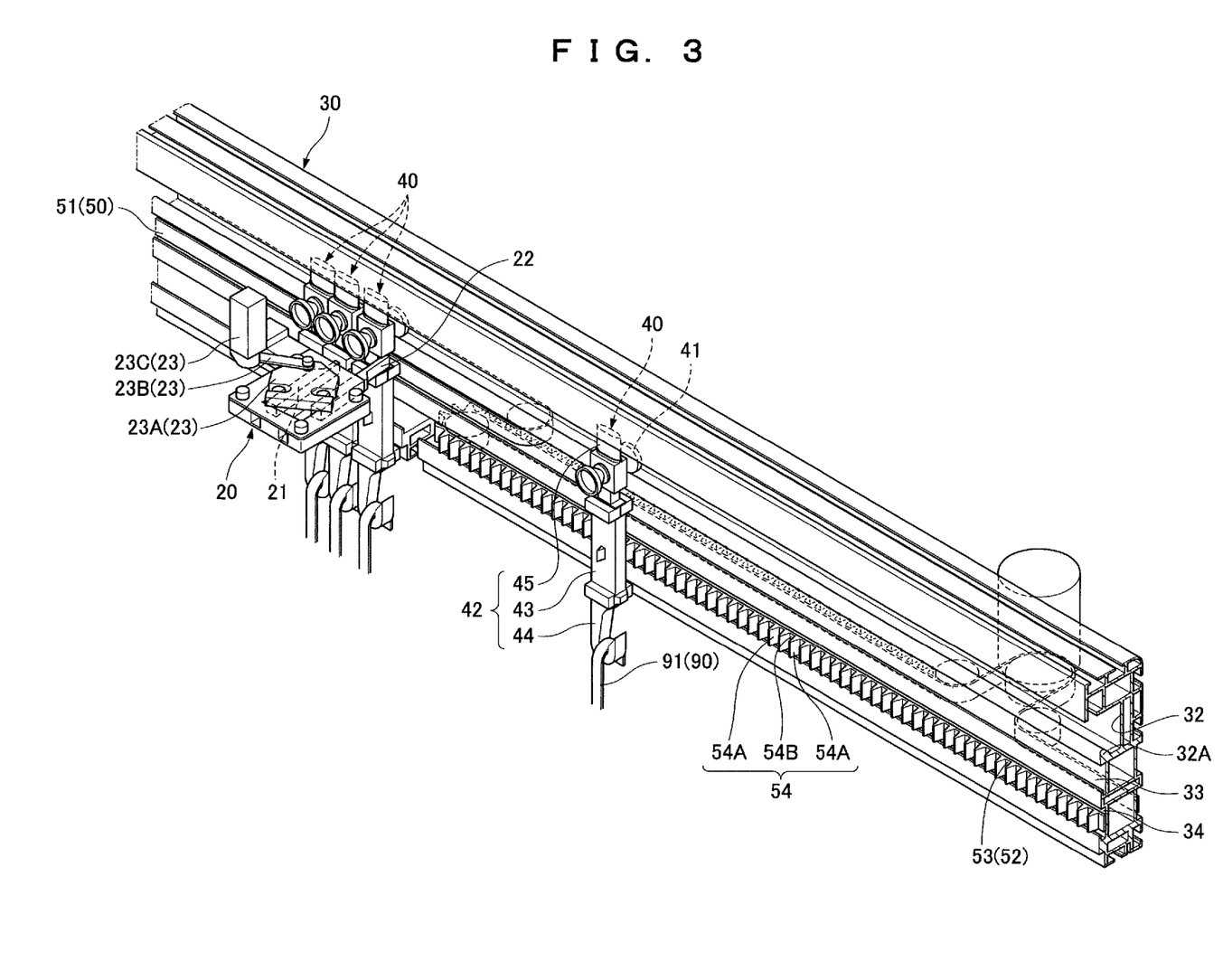
FIG. 3 is a perspective view of a traveling rail of the same conveyance facility.
Figure 4:
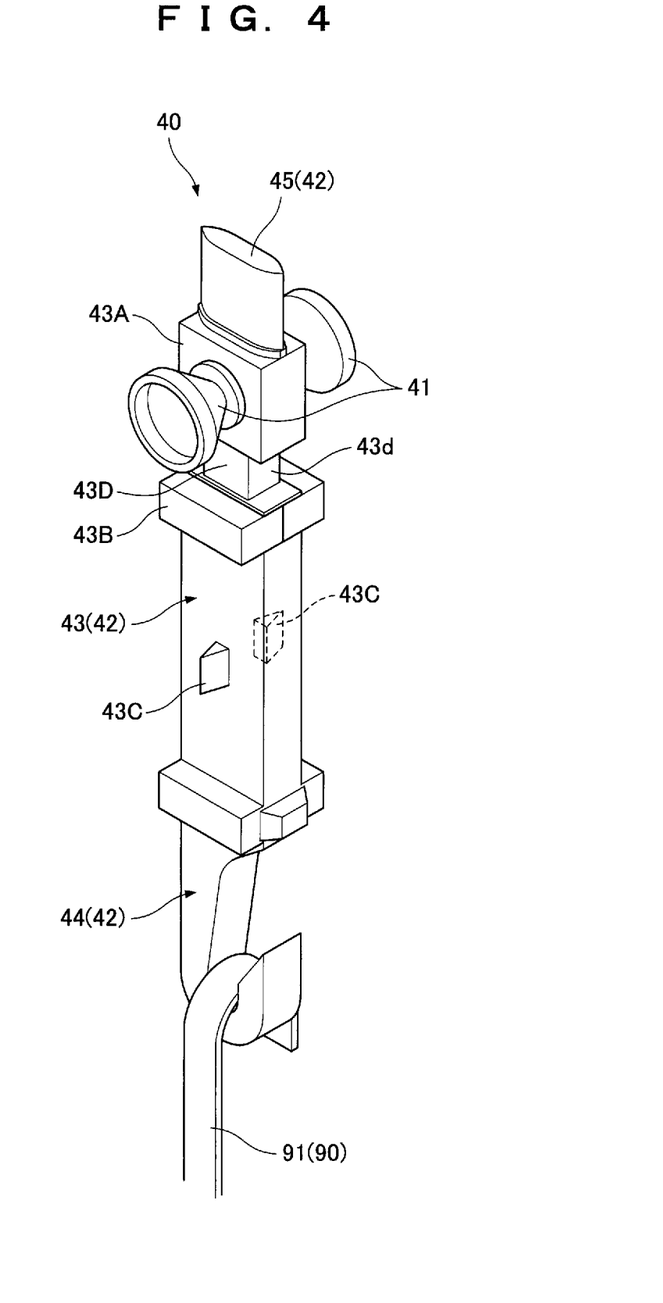
FIG. 4 is a perspective view of a carrier of the same conveyance facility.

As shown in FIGS. 1, 3 and 4, the conveyance facility 10 includes traveling rails 30 formed along the respective conveyance paths (the first path 11, the second path 12, and the detour path 13), and the carriers 40 being supported so as to be travelable by the traveling rails 30 and supporting the bags 90 being suspended.

Each of the traveling rails 30 is a frame material formed with an upper portion projecting more than a lower portion in the horizontal direction. The frame material is substantially reverse L-shaped as viewed from the side. The traveling rails 30 are extended along the respective conveyance paths (the first path 11, the second path 12, and the detour path 13). The traveling rail 30 supports a traveling wheel 41 of the carrier 40 so as to be travelable, as will be described. In the traveling rail 30, a guide groove 31 guiding an upper portion of the carrier 40, a wheel support groove 32 supporting the traveling wheel 41 of the carrier 40 so as to be travelable, an upper belt groove 33 supporting an accumulation belt 50 (an example of "friction transmission belt"), and a lower belt groove 34 supporting a tracking conveyance belt 52 (an example of "meshing transmission belt") are extended in a longitudinal direction. The traveling rail 30 is formed with the guide groove 31, the wheel support groove 32, the upper belt groove 33, and the lower belt groove 34, in order from the upper portion of the frame material. According to such a configuration of the traveling rail 30, the tracking conveyance belt 52 is arranged lower than the accumulation belt 50 in the traveling rail 30 arranged in the horizontal direction. Also, the accumulation belt 50 is arranged on the side of the traveling wheel 41 of the carrier 40 supported by the traveling rail 30.

The guide groove 31 is a groove-like portion (concave portion) formed at the upper portion (portion projecting in the horizontal direction) of the traveling rail 30. The groove-like portion opens in a vertical direction. The guide groove 31 is formed at the upper portion of the traveling rail 30 so as to cover the upper portion of the traveling carrier 40. The guide groove 31 holds an upper side surface of the carrier 40 in the groove-like portion, and guides the upper portion of the carrier 40 along the respective conveyance paths (the first path 11, the second path 12, and the detour path 13).

The wheel support groove 32 is a groove-like portion (concave portion) formed at an upper side surface of the traveling rail 30. The groove-like portion opens in the horizontal direction. The wheel support groove 32 can cause the traveling wheel 41 of the carrier 40 to travel. A lower edge portion 32A of the groove-like portion of the wheel support groove 32 is formed in accordance with the shape of the traveling wheel 41. The wheel support groove 32 supports the traveling wheel 41 so as to be travelable, at the edge portion 32A.

The upper belt groove 33 is a groove-like portion (concave portion) formed at a central side surface of the traveling rail 30. The groove-like portion opens in the horizontal direction. The accumulation belt 50 can stand in the vertical direction so as to fit the upper belt groove 33. The upper belt groove 33 can cause the circular accumulation belt 50 to circle along a side surface of the traveling rail 30. The upper belt groove 33 slidably supports the accumulation belt 50 along the side surface of the traveling rail 30.

The lower belt groove 34 is a groove-like portion (concave portion) formed at a lower side surface of the traveling rail 30. The groove-like portion opens in the horizontal direction. The tracking conveyance belt 52 can stand in the vertical direction so as to fit the lower belt groove 34. The lower belt groove 34 can cause the circular tracking conveyance belt 52 to circle along the side surface of the traveling rail 30. The lower belt groove 34 slidably supports the tracking conveyance belt 52 along the side surface of the traveling rail 30.

Figure 5:
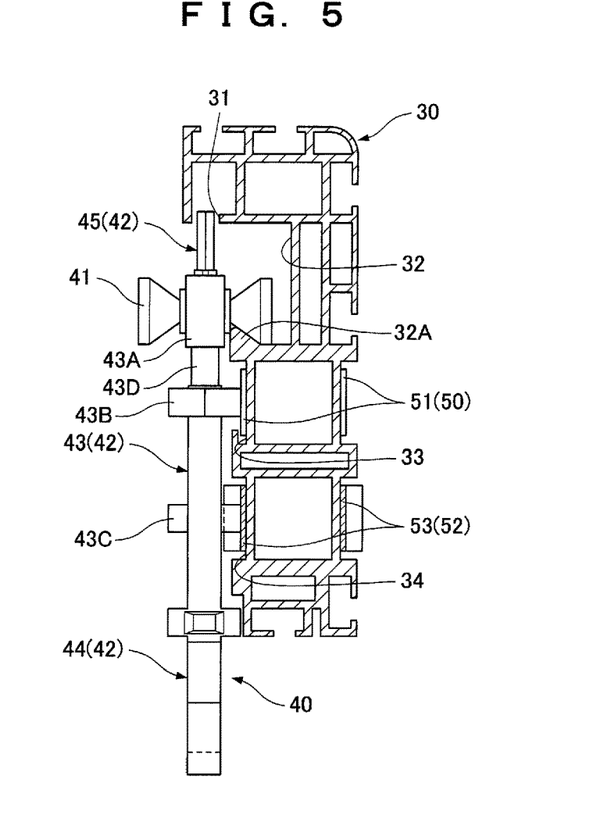
FIG. 5 is a cross-sectional view of the traveling rail of the same conveyance facility.

As shown in FIGS. 3 to 5, the carrier 40 includes the traveling wheel 41 (an example of "traveling body") supported so as to be travelable with respect to the traveling rail 30, and a support 42 formed integrally with the traveling wheel 41 and supporting the bag 90 being suspended.

The traveling wheel 41 includes a pair of substantially cone-shaped wheels. The traveling wheel 41 is turnably supported by an upper portion of the support 42. In the traveling wheel 41, one wheel of the pair of wheels is placed in the wheel support groove 32 of the traveling rail 30, and is supported so as to be travelable.

The support 42 is composed of a lengthy plate-like member. The support 42 mainly includes a body portion 43 as a main body portion of the support 42, a suspension portion 44 provided at a lower portion of the body portion 43 so as to support the bag 90 being suspended, and a head portion 45 provided at an upper portion of the body portion 43 so as to be guided by the traveling rail 30.

As shown in FIGS. 4 and 5, in the body portion 43, a wheel support portion 43A turnably supporting the traveling wheel 41, a contact portion 43B coming into contact with the accumulation belt 50, a meshing portion 43C being meshed with the tracking conveyance belt 52, and an engaging portion 43D engaging with the first stopper 21 and the second stopper 22 of the sending device 20 are formed.

The wheel support portion 43A is formed at the upper portion of the body portion 43. In the wheel support portion 43A, a turning shaft of the traveling wheel 41 is provided orthogonally to the horizontal direction, with respect to the traveling direction of the carrier 40 traveling in the horizontal direction.

The contact portion 43B is a block-like portion formed so as to project in the horizontal direction from both side surfaces of an upper central portion of the body portion 43. A tip end side surface of the contact portion 43B contacts with the accumulation belt 50. The contact portion 43B is formed with materials capable of friction transmission by the accumulation belt 50 (for example, rubber or the like).

Figure 6:
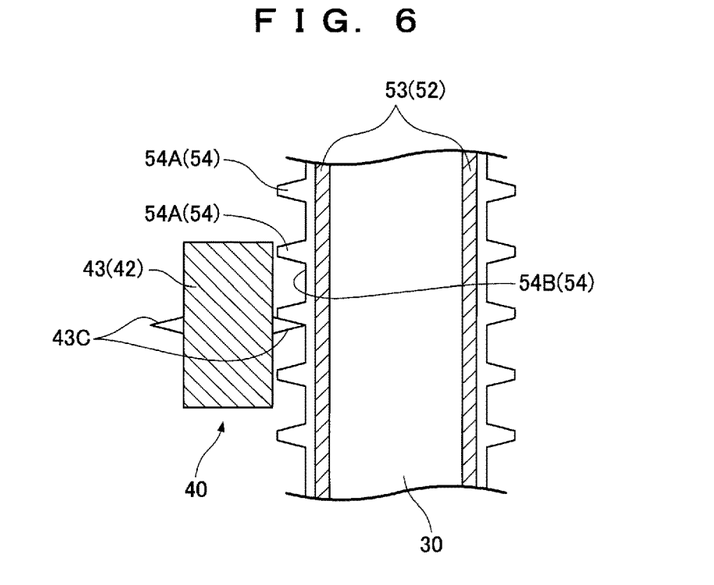
FIG. 6 is a schematic plan and cross-sectional view showing the carrier and a tracking conveyance belt of the same conveyance facility when the carrier is meshed with the tracking conveyance belt.

The meshing portion 43C is a flat plate-like convex member formed so as to project in the horizontal direction from both side surfaces of a central portion of the body portion 43. A tip end portion of the meshing portion 43C is meshed with the tracking conveyance belt 52. As shown in FIG. 6, in the meshing portion 43C, the tip end portion of the convex member is formed to be narrower than a base end portion of the convex member. The tip end portion of the convex member is also formed to be narrower than an interval between two adjacent peak portions 54A (a width of a valley portion 54B) of a concave portion 54 of the tracking conveyance belt 52, as will be described below. With this formation of the meshing portion 43C, in the meshing with the tracking conveyance belt 52, the tip end portion of the meshing portion 43C in contact with the peak portion 54A of the concave portion 54 may easily drop on the side of the valley portion 54B. Accordingly, the convex member of the meshing portion 43C may easily come into meshed contact with the valley portion 54B of the concave portion 54.

As shown in FIG. 4, the engaging portion 43D is a portion formed at an upper portion side of the body portion 43, and between the wheel support portion 43A and the contact portion 43B. In the engaging portion 43D, a notch portion 43d is formed at a side portion in the traveling direction of the carrier 40. The length of the carrier 40 in the traveling direction is thereby formed to be shorter than other portions (for example, the wheel support portion 43A). The engaging portion 43D engages with the first stopper 21 and the second stopper 22 of the sending device 20 at the notch portion 43d.

As shown in FIGS. 3 and 4, the suspension portion 44 is a hook-like portion extended from the lower portion of the body portion 43. The suspension portion 44 can hook and support a hook portion 91 formed at an upper portion of the bag 90.

The head portion 45 is a flat plate-like portion extended from the upper portion of the body portion 43. The head portion 45 is guided by the guide groove 31 of the traveling rail 30. The head portion 45 is formed so that a thickness in a direction orthogonal to the horizontal direction, with respect to the traveling direction of the carrier 40 traveling in the horizontal direction, is thinner than the body portion 43. A tip end portion of the head portion 45 is inserted into the guide groove 31. Both side surfaces of the head portion 45 are then held and guided by the guide groove 31.

As shown in FIGS. 3 and 5, the carrier 40 travels on the traveling rail 30 through either frictional contact with the accumulation belt 50 (the friction transmission by the accumulation belt 50), or the meshed contact with the tracking conveyance belt 52 (meshing transmission by the tracking conveyance belt 52).

The accumulation belt 50 is a circular friction transmission belt for causing the carrier 40 to travel through the friction transmission. The accumulation belt 50 is slidably provided in the upper belt groove 33 of the traveling rail 30, along the circumference of the traveling rail 30. In the accumulation belt 50, a belt 51 is formed to be flat and contactable with a side surface of the contact portion 43B of the body portion 43 of the carrier 40. The accumulation belt 50 puts the belt 51 into contact with the contact portion 43B of the carrier 40. The belt 51 in contact with the contact portion 43B is caused to slide along the upper belt groove 33 of the traveling rail 30. The carrier 40 (traveling wheel 41) is thereby caused to travel.

The tracking conveyance belt 52 is a circular meshing transmission belt for causing the carrier 40 to travel through the meshing transmission. The tracking conveyance belt 52 is slidably provided in the lower belt groove 34 of the traveling rail 30, along the circumference of the traveling rail 30. The tracking conveyance belt 52 causes the meshing portion 43C of the body portion 43 of the carrier 40 to be meshed with a belt 53. The belt 53 meshed with the meshing portion 43C is caused to slide along the lower belt groove 34 of the traveling rail 30. The carrier 40 (traveling wheel 41) is thereby caused to travel. In the tracking conveyance belt 52, a plurality of the concave portions 54 are formed on the belt 53 so as to be meshed with the meshing portion 43C of the carrier 40. As shown in FIGS. 3 and 6, the concave portion 54 consists of the two peak portions 54A, and the valley portion 54B linking the adjacent peak portions 54A together. For the concave portions 54, the peak portions 54A and the valley portions 54B are alternately and continuously formed along a moving direction (sliding direction) of the tracking conveyance belt 52. The meshing portion 43C of the body portion 43 of the carrier 40 is meshed between the two peak portions MA (with the valley portion MB) of the concave portion 54. The tracking conveyance belt 52 is thereby put into meshed contact with the carrier 40. In other words, the meshing portion 43C of one carrier 40 is meshed with one concave portion. Thereby, the carrier 40 becomes held by the tracking conveyance belt 52. When the belt 53 slides, movement of the carrier 40 is controlled by the interval between the two peak portions 54A (the width of the valley portion 54B) of the concave portion 54.

The accumulation belt 50 and the tracking conveyance belt 52 are arranged at different positions of the traveling rail 30. Specifically, on the traveling rail 30, the tracking conveyance belt 52 is arranged at a position (the lower belt groove 34) lower than a position (the upper belt groove 33) where the accumulation belt 50 is arranged. In other words, the accumulation belt 50 is arranged so as to be frictionally contactable with the carrier 40 on a side near the traveling wheel 41 (at the contact portion 43B) in the body portion 43 of the carrier 40. The tracking conveyance belt 52 is arranged to be able to be meshed contact with the carrier 40 on a side far from the traveling wheel 41 (at the meshing portion 43C) in the body portion 43 of the carrier 40. In such arrangements, for the frictional contact of the carrier 40 with the accumulation belt 50, the side (contact portion 43B) near the traveling wheel 41 in the carrier 40 contacts with the accumulation belt 50. For the meshing between the carrier 40 and the tracking conveyance belt 52, the side (meshing portion 43C) far from the traveling wheel 41 in the carrier 40 contacts with the tracking conveyance belt 52. Accordingly, the carrier 40 can travel at a stable position without jounce in conveyance in contact with the respective belts.

As shown in FIG. 3, the accumulation belt 50 and the tracking conveyance belt 52 are arranged at different positions from a boundary at the sending device 20 arranged on the upstream side of the branch portion 15 of the first path 11. Specifically, the accumulation belt 50 is arranged on the upstream side from a position where the sending device 20 is arranged. The tracking conveyance belt 52 is arranged on the downstream side from the position where the sending device 20 is arranged.

The travel of the carrier 40 on the first path 11 will be described. The carrier 40 travels on the first path 11 through the friction transmission by the accumulation belt 50. The carrier 40 is sent out by the sending device 20, and thereby travels on the first path 11 while keeping the predetermined intervals between the adjacent carriers 40. The traveling path of some carriers 40 of the multiple carriers 40 traveling on the first path 11 is switched to the detour path 13 by the branch unit 60. The branch unit 60 then switches the traveling path for each carrier 40. The carriers 40 thus need to be caused to travel to the branch portion 15 (branch unit 60) at the predetermined intervals kept between the adjacent carriers 40.

Accordingly, in the conveyance facility 10, the carriers 40 sent out by the sending device 20 at the predetermined intervals are caused to travel to the branch portion 15 through the meshing transmission by the tracking conveyance belt 52. The carriers 40 are thus caused to travel to the branch portion 15 at the predetermined intervals kept between the adjacent carriers 40. In other words, the carriers 40 are caused to travel on the way to the sending device 20 through the friction transmission by the accumulation belt 50. The carriers 40 are caused to travel on the downstream side from the sending device 20, through the meshing transmission by the tracking conveyance belt 52.

As has been described, according to the present embodiment, the travel of the carrier 40 is switched from the travel in the frictional contact with the accumulation belt 50, to the travel in the meshed contact with the tracking conveyance belt 52. Misalignment of the carrier 40 with respect to the belt can thereby be reliably limited. Accordingly, the multiple carriers 40 can be caused to travel at the intervals kept between the multiple carriers 40, without any effect of a traveling status of the carriers 40.

In particular, since the carrier 40 traveling on the downstream side of the sending device 20 is caused to travel in the meshed contact, the carrier 40 can be caused to travel at the intervals caused by the sending device 20 while the intervals are reliably kept. In addition, the carrier 40 can be reliably directed to the detour path 13 at the branch unit 60.

In the present embodiment, the article conveyed in the conveyance facility 10 is the bag 90. The article is, however, not limited thereto, and may be any article capable of being suspended by the carrier 40.

In the present embodiment, the meshing portion 43C of the carrier 40 is composed of the flat plate-like convex member. The meshing portion 43C is, however, not limited thereto, and may be composed of a concave member, for example, as long as the meshing between the tracking conveyance belt 52 is possible. In this case, the peak portion 54A of the concave portion 54 of the tracking conveyance belt 52 is meshed with the concave member of the meshing portion 43C.

In the present embodiment, one meshing portion 43C is provided on the body portion 43 of the carrier 40. The meshing portion 43C is, however, not limited thereto. Multiple meshing portions 43C may be provided on the body portion 43, as long as the meshing between the tracking conveyance belt 52 is possible.

In the present embodiment, the tracking conveyance belt 52 is arranged on the downstream side from a position where the accumulation belt 50 is arranged. The tracking conveyance belt 52 and the accumulation belt 50 are not limited to such arrangements. For example, at the joint portion 16, that is, at the joint section between the detour path 13 and the second path 12, if the tracking conveyance belt 52 is arranged on the upstream side of the joint portion 16, and the accumulation belt 50 is arranged on the downstream side of the joint portion 16, the tracking conveyance belt 52 may also be arranged on the upstream side from the position where the accumulation belt 50 is arranged.

What is claimed is:

1. A conveyance facility for conveying an article along a conveyance path, comprising:

a conveyance unit comprising a traveling body traveling on the conveyance path, and a support traveling with the traveling body and supporting the article being suspended, the conveyance unit conveying the article along the conveyance path; and a traveling rail provided along the conveyance path and supporting the traveling body so as to be travelable, wherein the traveling rail comprises:
   a friction transmission belt in frictional contact with the support; and
   a meshing transmission belt being meshed with the support, wherein both the friction transmission belt and the meshing transmission belt are arranged on the same traveling rail and each is operative to cause the traveling body to travel along at least a portion of the same traveling rail;

a sending device provided on the conveyance path, and sending out a plurality of the conveyance units traveling on the conveyance path, at predetermined intervals, wherein the friction transmission belt is arranged on an upstream side from a position where the sending device is arranged, and wherein the meshing transmission belt is arranged on the downstream side from the position where the sending device is arranged.

2. The conveyance facility according to claim 1, wherein the meshing transmission belt is arranged on a downstream side from a position where the friction transmission belt is arranged.

3. The conveyance facility according to claim 1, wherein the meshing transmission belt is arranged lower than a position where the friction transmission belt is arranged in the traveling rail arranged horizontally.

4. The conveyance facility according to claim 1, wherein the support comprises:
a contact portion coming into contact with the friction transmission belt; and
a meshing portion being meshed with the meshing transmission belt.

5. The conveyance facility according to claim 4, wherein the meshing transmission belt comprises multiple concave portions to be meshed with the meshing portion, and
wherein the concave portions are formed so that multiple peak portions and multiple valley portions are alternately and continuously formed along a moving direction of the meshing transmission belt.

6. The conveyance facility according to claim 5, wherein the meshing portion is composed of a convex member capable of being meshed with the valley portions of the concave portions, and
wherein a tip end portion of the convex member is formed to be narrower than a base end portion of the convex member, and narrower than a width of each of the valley portions of the concave portions.

* * * * *